United States Patent
Sabiwalsky et al.

(10) Patent No.: US 10,110,582 B2
(45) Date of Patent: Oct. 23, 2018

(54) DUAL TOKEN BASED AUTHENTICATION AND TRANSPORT MECHANISM

(71) Applicant: SAP SE, Walldorf (DE)

(72) Inventors: Dirk Sabiwalsky, Sandhausen (DE); Henrike Schuhart, Wiesloch (DE); Christoph Scheiber, Reilingen (DE); Timur Fichter, Schwetzingen (DE)

(73) Assignee: SAP SE, Walldorf (DE)

( * ) Notice: Subject to any disclaimer, the term of this patent is extended or adjusted under 35 U.S.C. 154(b) by 229 days.

(21) Appl. No.: 15/154,202

(22) Filed: May 13, 2016

(65) Prior Publication Data

US 2017/0331806 A1   Nov. 16, 2017

(51) Int. Cl.
*H04L 29/06*   (2006.01)
*H04L 29/08*   (2006.01)

(52) U.S. Cl.
CPC .......... *H04L 63/08* (2013.01); *H04L 63/062* (2013.01); *H04L 63/18* (2013.01)

(58) Field of Classification Search
CPC ........ H04L 63/08; H04L 63/062; H04L 67/10
See application file for complete search history.

(56) References Cited

U.S. PATENT DOCUMENTS

| | | | |
|---|---|---|---|
| 7,603,260 B2 | 10/2009 | Schmitz et al. | |
| 8,306,862 B2 | 11/2012 | Weiler et al. | |
| 8,412,549 B2 | 4/2013 | Graeber et al. | |
| 8,473,584 B2 | 6/2013 | Sabiwalsky | |
| 8,560,392 B2 | 10/2013 | Asal et al. | |
| 8,615,451 B1 | 12/2013 | Thiele et al. | |
| 8,966,599 B1* | 2/2015 | Barrows | H04L 63/08 705/37 |
| 9,146,802 B2 | 9/2015 | Tran et al. | |
| 9,405,896 B2* | 8/2016 | Simone | G06F 21/41 |
| 2013/0179229 A1 | 7/2013 | Graeber et al. | |
| 2014/0006221 A1 | 1/2014 | Thiele et al. | |
| 2014/0006222 A1 | 1/2014 | Hericks et al. | |
| 2014/0047522 A1* | 2/2014 | Chin | H04L 63/0807 726/6 |
| 2014/0068742 A1* | 3/2014 | Phillips | G06Q 20/327 726/7 |
| 2014/0325221 A1* | 10/2014 | Rothschild | H04L 63/0815 713/168 |

(Continued)

*Primary Examiner* — Yonas A Bayou
(74) *Attorney, Agent, or Firm* — Fish & Richardson P.C.

(57) ABSTRACT

A client token is generated for a client process in response to a client token request. An authentication request including the client token is received from a client endpoint associated with the client process. The client endpoint is authenticated, including generating and providing an endpoint token to the client endpoint. A first mapping between the client token and transport channels used for messages received from the client process and a second mapping between the client endpoint and the client token are generated. A first message is received over a first transport channel from the client endpoint, the message including the client token and the endpoint token. A response to the first message is sent to the client endpoint over a second transport channel, without re-authenticating the client endpoint, the second transport channel being different than the first transport channel and being selected based on the first and second mappings.

20 Claims, 11 Drawing Sheets

(56) References Cited

U.S. PATENT DOCUMENTS

| | | | |
|---|---|---|---|
| 2014/0337955 A1* | 11/2014 | Mendelovich | H04L 63/0807 726/9 |
| 2014/0344160 A1* | 11/2014 | Buer | G06F 21/34 705/67 |
| 2014/0351594 A1* | 11/2014 | Soulios | H04L 9/3213 713/168 |
| 2015/0007301 A1* | 1/2015 | Horn | H04L 9/32 726/9 |
| 2015/0058634 A1* | 2/2015 | Watsen | H04L 41/28 713/175 |
| 2015/0249651 A1* | 9/2015 | Okamoto | H04L 63/08 713/171 |
| 2015/0334099 A1* | 11/2015 | Zhang | G06F 21/45 726/6 |
| 2015/0341330 A1* | 11/2015 | Field-Eliot | H04L 63/0807 726/4 |
| 2017/0187700 A1* | 6/2017 | Rangaraj | H04L 63/08 |

* cited by examiner

DUAL TOKEN BASED AUTHENTICATION AND TRANSPORT MECHANISM

BACKGROUND

In distributed computing, a client computer program can cause a procedure (subroutine) to execute in another address space. The other address space can be associated with a server computer on a shared network. The subroutine can be coded using a same syntax as a local procedure call, without the programmer needing to code details for the remote interaction. That is, the programmer can write essentially the same code whether the subroutine is local to the executing program, or remote. The subroutine call can be implemented using a request-response message-passing system.

SUMMARY

The present disclosure describes methods and systems, including computer-implemented methods, computer program products, and computer systems for dual-token authentication mechanism.

In an implementation, a client token is generated for a client process in response to a client token request. An authentication request including the client token is received from a client endpoint associated with the client process. The client endpoint is authenticated, including generating and providing an endpoint token to the client endpoint. A first mapping between the client token and transport channels used for messages received from the client process and a second mapping between the client endpoint and the client token are generated. A first message is received over a first transport channel from the client endpoint, the message including the client token and the endpoint token. A response to the first message is sent to the client endpoint over a second transport channel, without re-authenticating the client endpoint, the second transport channel being different than the first transport channel and being selected based on the first and second mappings.

Particular implementations of described methods and systems can include corresponding computer systems, apparatuses, or computer programs (or a combination of computer systems, apparatuses, and computer program) recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, causes the system to perform the actions. One or more computer programs can be configured to perform particular operations or actions by virtue of including instructions that, when executed by data processing apparatus, cause the apparatus to perform the actions.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, an authentication mechanism can be independent of a used transport channel. Second, different endpoints can authenticate with different credentials while using a same transport channel. Third, a server endpoint can send a message to a client endpoint using a transport channel other than the one that the client endpoint used for authentication. Fourth, a client endpoint can avoid needing to re-authenticate when a new transport channel is used for communication between a server endpoint and the client endpoint. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes a dual-token authentication mechanism and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

The dual-token authentication mechanism can enable multiple communication endpoints associated with multiple client processes to authenticate at a server process. The dual-token authentication mechanism can enable the use of multiple transport channels between a client process and a server process at a same time while preserving an authentication state of each client endpoint within the client process regardless of which transport channel is used for a communication. The dual-token authentication mechanism can enable the server process to use any available transport channel to send a message to an authenticated endpoint regardless of which transport channel was used for an initial authentication. The dual-token authentication mechanism can include a protocol used between communication endpoints in a client process and a server process. Credentials can be sent to the server process in an authentication request. A secure token (endpoint token) can be returned to the client endpoint upon successful validation of the credentials. The endpoint token can be included in every message the client endpoint sends to a server endpoint regardless of the used transport channel. An endpoint token enables the server to identify and validate the sender of a message.

A secure token (client token) that uniquely identifies a client process can be obtained by the client process by a request to the server process using any transport channel before any other communication occurs from the client process to the server process. The client token is included in any future message the client process sends to the server process. The client token enables the server to associate transport channels with a client process. The server can use the associations to identify an available transport channel that is associated with a client token for sending messages to client endpoints associated with the client process.

Figure 1:
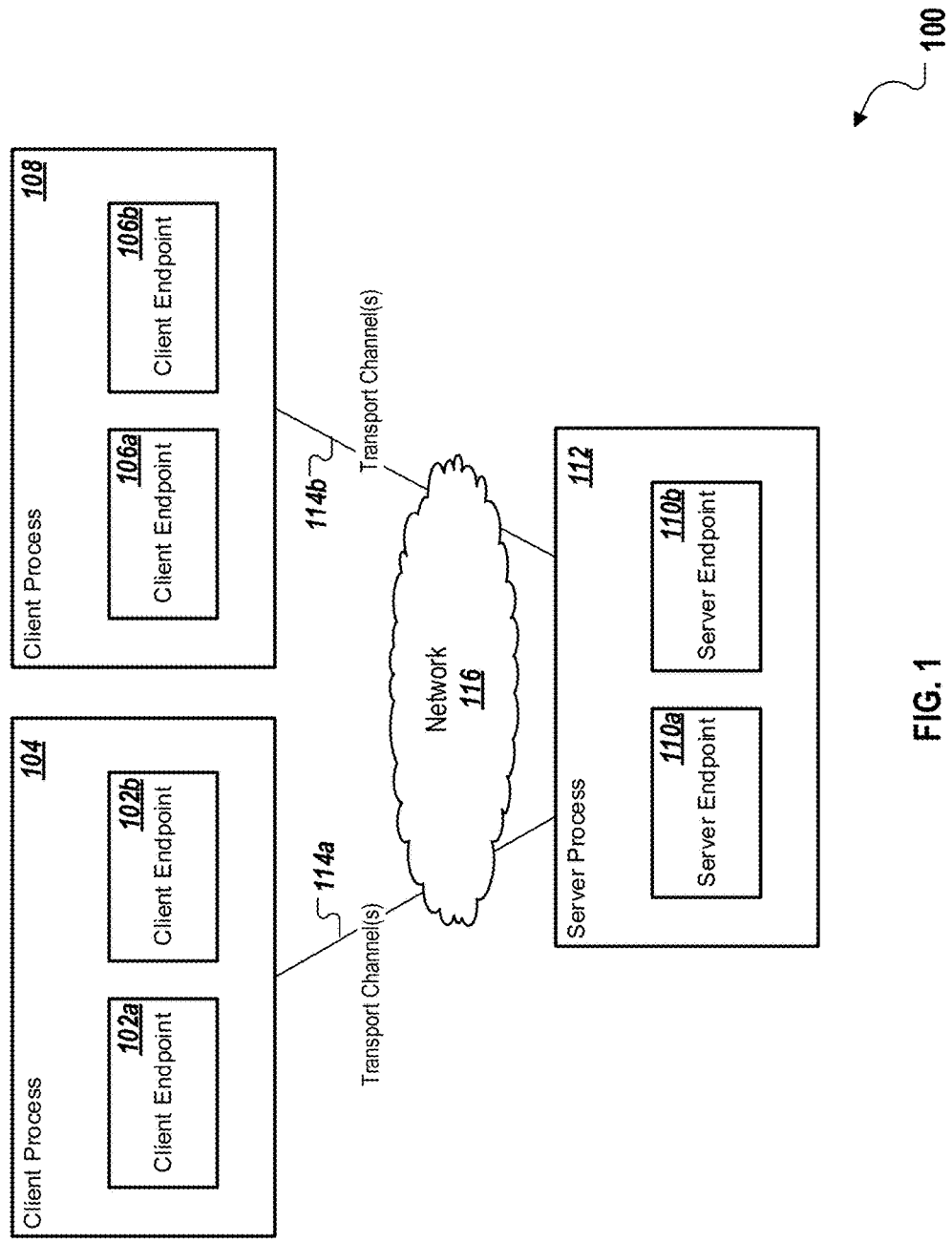
FIG. 1 is a high-level architectural block diagram illustrating a client/server based messaging environment, according to an implementation.

FIG. 1 is a high-level architectural block diagram illustrating a client/server based messaging environment 100, according to an implementation. Messages can be passed between endpoints included in the environment 100. An endpoint is a software component within a process that may send or receive messages. Client endpoints 102a or 102b within a client process 104 or client endpoints 106a or 106b within a client process 108 can exchange messages with server endpoints 110a or 110b within a server process 112 (or within server endpoints in other processes). The server endpoints 110a and 110b can provide functionality or service(s) to the client endpoints 102a, 102b, 106a, and 106b. The client endpoints 102a, 102b, 106a, and 106b can consume services provided by the server endpoints 110a and 110b. As shown in the environment 100, multiple endpoints may reside in a single process. The client processes 104 and 108 and the server process 112 may reside on the same or different physical machines.

The exchange of messages between client and server endpoints can be performed using one or more transport channels such as transport channel(s) 114a and 114b. The transport channels 114a and 114b are software components that are responsible for sending messages from a particular process to a different process, such as over a network 116 or some other physical connection. Different transport channels can be used between the same two processes.

The transport channel(s) 114a and 114b can include, for example, TCP/IP (Transport Control Protocol/Internet Protocol), Remote Direct Memory Access (RDMA), or other transport protocols. A RDMA transport channel uses direct memory access from one computing device to another without involving the operating systems of the respective computing devices. A security protocol such as TLS (Transport Layer Security), some other encryption protocol, or some other protocol can be used to protect communication on the transport channel(s) 114a and 114b, such as from eavesdropping or man-in-the-middle attacks. A man-in-the-middle attack is an attack where an attacker process silently intercepts and possibly modifies transmitted data.

A client endpoint 102a, 102b, 106a or 106b can authenticate at the server process 112 before messages are exchanged. For example, in order to protect resources within the server process 112, a client endpoint 102a, 102b, 106a or 106b can be required to authenticate at the server process 112 before exchanging messages with the server endpoints 110a or 110b. As described in more detail below, an authentication mechanism can be independent of a used transport channel. Different endpoints can authenticate with different credentials while using the same transport channel. The authentication mechanism can also enable the server endpoints 110a or 110b to send a message back to a client endpoint 102a, 102b, 106a, or 106b using any of the transport channels 114a or 114b, including a transport channel other than the one that the respective client endpoint 102a, 102b, 106a, or 106b used for authentication. The authentication mechanism can result in not needing to repeat authentications of a same endpoint when switching a transport channel.

Figure 2:
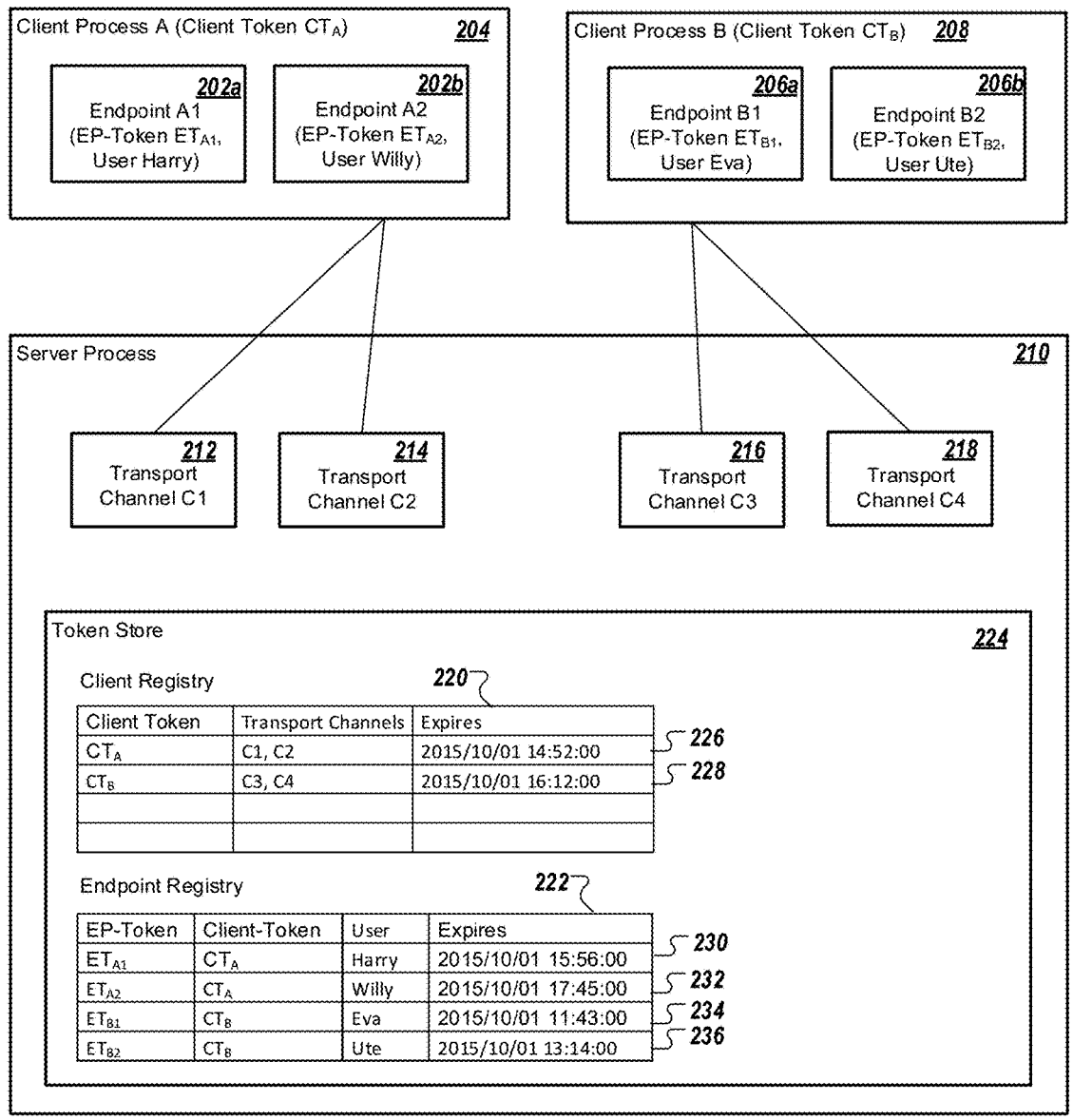
FIG. 2 illustrates an example system for dual-token authentication, according to an implementation.

FIG. 2 illustrates an example system 200 for dual-token authentication, according to an implementation. Client endpoints "A1" 202a and "A2" 202b in a client process "A" 204, and client endpoints "B1" 206a and "B2" 206b in a client process "B" 208 can be configured to communicate with one or more server endpoints in a server process 210. The system 200 is configured so that a communication session between a client endpoint 202a, 202b, 206a, or 206b and the server 210 can use multiple transport channels without requiring a respective client endpoint to re-authenticate at the server 210. For example, communication between the client endpoint 202a or the client endpoint 202b and the server 210 can use both a transport channel "C1" 212 and a transport channel "C2" 214 and communication between the client endpoint 206a or the client endpoint 206b and the server 210 can use both a transport channel "C3" 216 and a transport channel "C4" 218.

Multiple transport channels can be used for performance and flexibility reasons. There may be more client endpoints than available connections, for example. The system 200 can be configured so that all of the client endpoints are served over a lesser number of connections. A client endpoint 202a, 202b, 206a, or 206b can authenticate at the server 210 and the authentication can be made available to and used over multiple transport channels 212, 214, 216, and 218 rather than being bound to a single transport channel 212, 214, 216, or 218. If a client endpoint 202a, 202b, 206a, or 206b authenticates through one transport channel 212, 214, 216, or 218, the server 210 can be configured to send a response using a different transport channel 212, 214, 216, or 218.

To enable the server process 210 to identify all transport channels that are available to reach a client endpoint, a client token can be assigned to the client process that includes the client endpoint. The client token can be a secure token that uniquely identifies the client process. Before the client endpoints 202a or 202b communicate with the server 210, the client process 204 requests a client token from the server 210. Similarly, before the client endpoints 206a or 206b communicate with the server 210, the client process 208 requests a client token from the server 210. In response to a client token request, the server 210 generates and provides a client token to the respective requesting client process. For example, the server 210 can provide a client token "$CT_A$" to the client process 204 and a client token "$CT_B$" to the client process 208. Communications from the client endpoints 202a or 202b to the server 210 can include the client token "$CT_A$" and communications from the client endpoints 206a or 206b to the server 210 can include the client token "$CT_B$".

The server 210 can maintain a client registry 220 and an endpoint registry 222 in a token store 224. The server process 210 can use the client registry 220 to associate a given transport channel to a given client token after receiving a message over the transport channel that includes the client token. For example, the server process 210 can map a client token to a transport channel after generating the client token in response to a client token request received over the transport channel. As another example, the server process 210 can map a client token to a transport channel in response to receiving the client token in a communication from a client endpoint over the transport channel. A communication from a client endpoint can be an authentication request or a message sent after the client endpoint has been authenticated at the server 210. A client endpoint 202a, 202b, 206a, or 206b can authenticate at the server 210 using a transport channel selected by the respective client endpoint.

A row 226 in the client registry 220 indicates that the transport channels "C1" 212 and "C2" 214 have been used in association with the client token "CTA". The server 210 can use either the transport channels "C1" 212 or the transport channel "C2" 214 when sending a response or other message to the client endpoints 202a or 202b, regardless of which transport channel was previously used for a received message or other previous communication. A row 228 in the client registry 220 indicates that the transport channels "C3" 216 and "C4" 218 have been used in association with the client token "CTB". The server 210 can use either the transport channels "C3" 216 or the transport channel "C4" 218 when sending a response or other message to the client endpoints 206a or 206b. The server 210 can select a particular transport channel based on current traffic on available channels (one or more channels may be idle or have less traffic), message priority, speed of a connection, etc.

The rows 226 and 228 each include an expiration timestamp indicating an expiration time for a respective client token. When a client token expires, a respective client process can re-request a client token from the server 210.

The server process 210 can use the endpoint registry 222 to store associations between endpoint tokens and client tokens. As mentioned above, a message sent from a client endpoint 202a, 202b, 206a, or 206b to the server 210 includes a client token associated with the client process 204 or 208 that is associated with the respective client endpoint. A row 230 in the endpoint registry 222 indicates that an endpoint token "ETA1" generated for the client endpoint 202a is associated with the client token "CTA" and user credentials of "Harry". A row 232 in the endpoint registry 222 indicates that an endpoint token "ETA2" generated for the client endpoint 202b is associated with the client token "CTA" and user credentials of "Willy". A row 234 in the endpoint registry 222 indicates that an endpoint token "ETB1" generated for the client endpoint 206a is associated with the client token "CTB" and user credentials of "Eva". A row 236 in the endpoint registry 222 indicates that an endpoint token "ETB2" generated for the client endpoint 206b is associated with the client token "CTB" and user credentials of "Ute".

Figure 3:
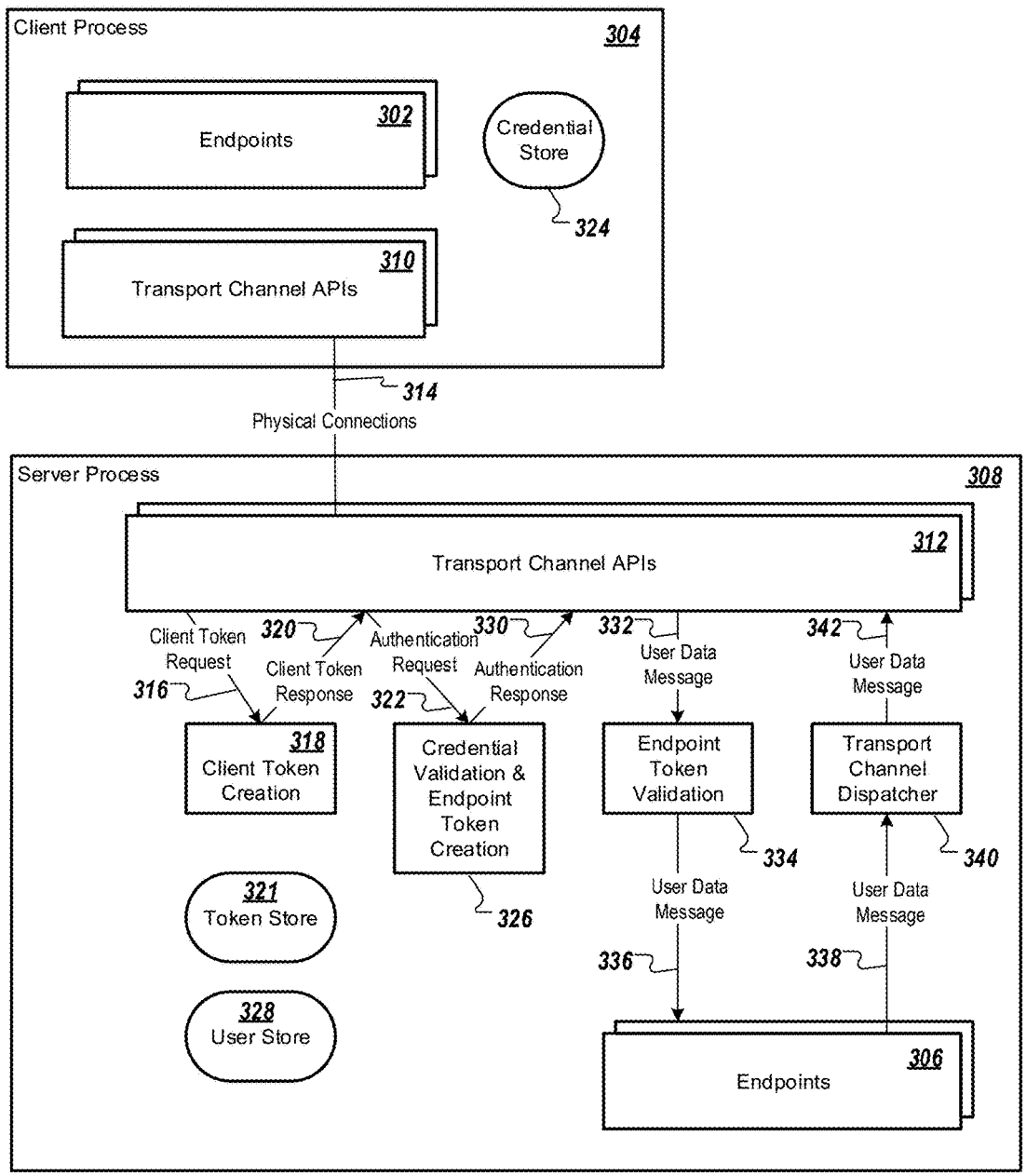
FIG. 3 illustrates an example system for endpoint authentication, according to an implementation.

FIG. 3 illustrates an example system 300 for endpoint authentication, according to an implementation. Client endpoints 302 in a client process 304 can communicate with server endpoints 306 in a server process 308. The client process 304 can use transport channel APIs 310 to communicate with corresponding transport channel APIs components 312 in the server process 308 across one or more physical connection 314.

The client process 304 can submit a client token request 316 to the server process 308. A client token creation component 318 in the server process 308 can generate a client token for the client process 304 and send the client token to the client process 304 in a client token response 320. As described above with respect to FIG. 2, mappings between the client token and transport channels used for the client process 304 can be stored in a token store 321. The token store 321 in the server process 308 includes client tokens, endpoint tokens, user names, transport channel identifiers, and relationships between these items, and expiration dates associated with these items.

A client endpoint 302 can send an authentication request 322 to the server process 308. The authentication request 322 can include user credentials from a credential store 324 and the client token previously generated for the client process 304. The credential store 324 in the client process 304 can include user credentials that are being used to authenticate at the server process 308. The user credentials can include secret information owned by a user, such as a user name and password, which can be used to authenticate the user at the server process 308. A credential validation and endpoint token creation component 326 can validate the authentication request 322, such as by comparing received credentials to information included in a user store 328. The user store 328 in the server process 308 is a secure store that includes user names and related credentials that are used to validate authentication requests.

If the authentication request 322 is validated, the credential validation and endpoint token creation component 326 creates an endpoint token for the requesting client endpoint 302 and includes the endpoint token in an authentication response 330. A mapping between the endpoint token and the client token included in the authentication request 322 can be stored in the token store 321. Any transport channel associated with the client process 304 can be used to send the authentication response 330.

At a later time, a client endpoint 302 sends a user data message 332 to a server endpoint 306. The user data message 332 can include the client token associated with the client process 304, the endpoint token associated with the sending client endpoint 302, and a message payload. An endpoint token validation component 334 can validate the client token and the endpoint token and can, upon successful validation, forward the user data message 332 to the server endpoint 306 as a forwarded user data message 336.

The server endpoint 306 can generate a response as a user data message 338 for sending to the client endpoint 302 (the user data message 338 can also be a message sent by the server endpoint 306 that is not in response to a message sent by the client endpoint 302). A transport channel dispatcher 340 can select a transport channel to use for the sending of the user data message 338. The transport channel dispatcher can select any transport channel associated with the client token associated with the client process 304, based on characteristics of the transport channels, as described above. The user data message 338 can be sent over the selected transport channel to the client endpoint 302, using the transport channel APIs 312 and 310, as illustrated by a message 342.

Figure 4:
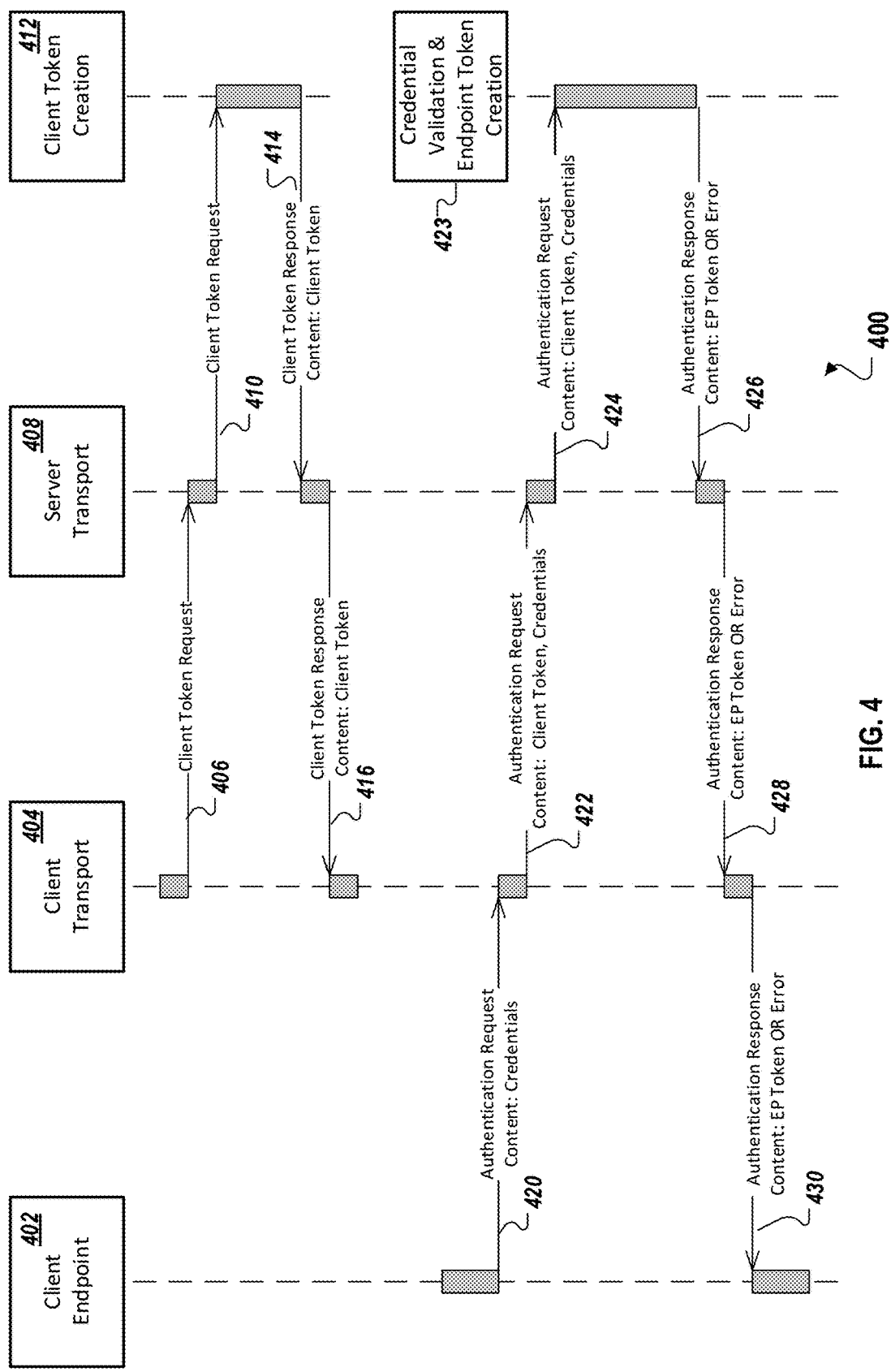
FIG. 4 is a flowchart of an example method for an initial authentication of a client endpoint, according to an implementation.

FIG. 4 is a flowchart of an example method 400 for an initial authentication of a client endpoint 402, according to an implementation. Before the client endpoint 402 sends messages, a client transport component 404 sends, using a transport channel, a client token request 406 to a server transport component 408 for a client token for the client process that includes the client endpoint 402. The server transport component 408 forwards the client token request 406 (for example, as a forwarded request 410) to a client token creation component 412 included in the server. The client token creation component 412 creates a client token in response to the request 410 and sends a client token response 414 to the server transport component 408 that includes the client token. The client token is a secure token that uniquely identifies the client process. The server transport component 408 forwards, using a transport channel, the client token response 414 including the client token (for example, as a forwarded client token response 416) to the client transport component 404.

At a later time, the client endpoint 402 sends an authentication request 420 to the client transport component 404. The authentication request 420 includes credentials associated with the client endpoint 402. The client transport component 404 forwards the authentication request 420 to the server transport component 408 (for example, as a forwarded authentication request 422), using a transport channel. The forwarded authentication request 422 incudes the credentials included in the authentication request 420 and the client token that the client transport component 404 received in the client token response 416. The server transport component 408 forwards the authentication request 422 to a credential validation and endpoint token creation component 423 (for example, as a forwarded authentication request 424).

The credential validation and endpoint token creation component 423 validates the credentials included in the forwarded authentication request 424. If the credentials are valid, the credential validation and endpoint creation component 423 creates an endpoint token for the client endpoint 402 that uniquely identifies the client endpoint 402. The credential validation and endpoint token creation component 423 sends an authentication response 426 to the server transport component 408. The authentication response 426 includes either an endpoint (EP) token (if the credentials are valid) or an indication of an error (if the credentials are not valid). The server transport component 408 forwards the authentication response 426 (for example, as a forwarded authentication response 428) to the client transport component 404, using a transport channel. The client transport component 404 forwards the authentication response 428 to the client endpoint 402 (for example, as a forwarded authentication response 430). The client endpoint 402 includes the received endpoint token in future messages that the client endpoint 402 sends to server endpoints included in the server.

Figure 5:
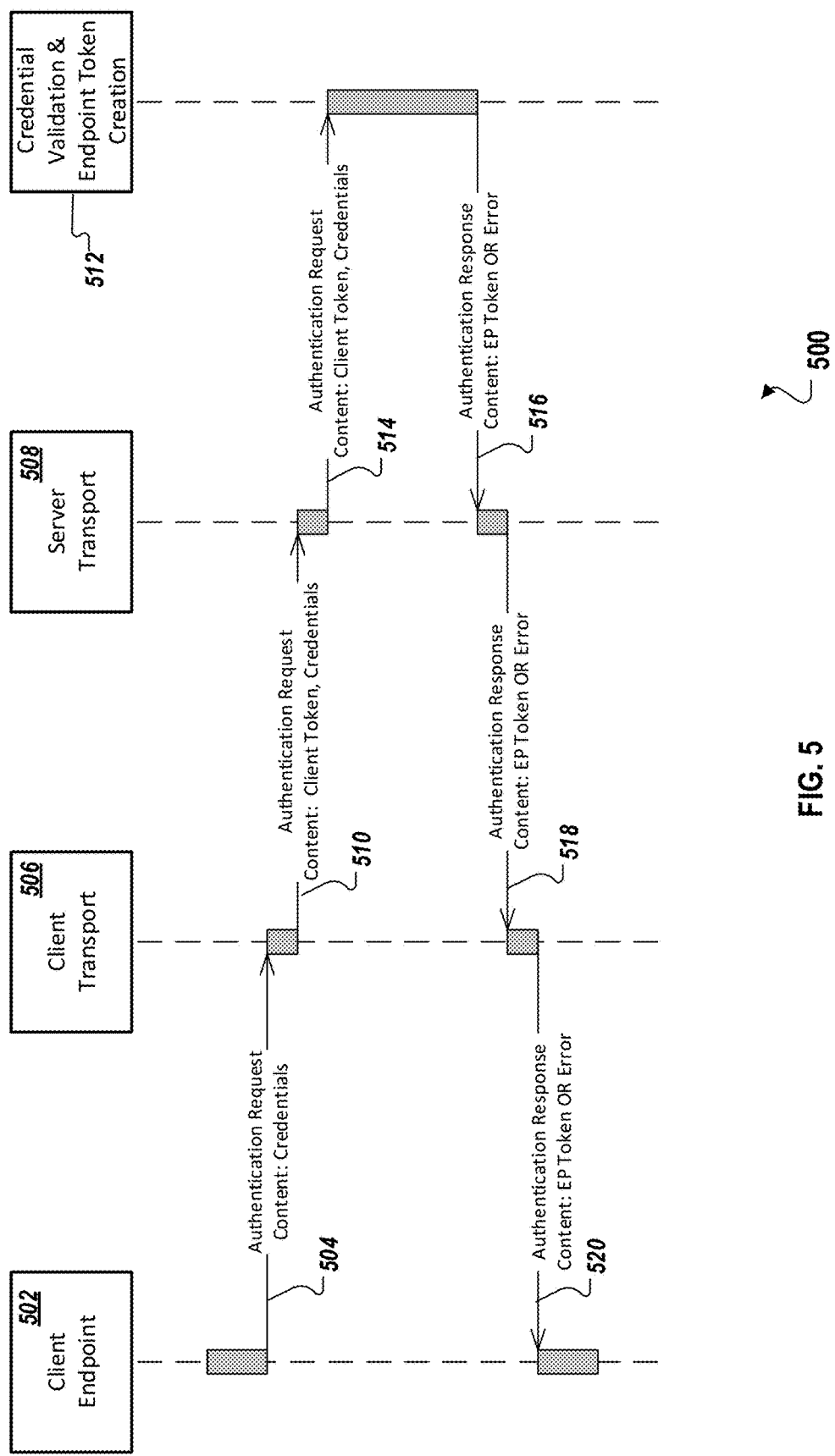
FIG. 5 is a flowchart of an example method for authenticating a client endpoint after an initial authentication has been performed, according to an implementation.

FIG. 5 is a flowchart of an example method 500 for authenticating a client endpoint 502 after an initial authentication has been performed, according to an implementation. The client endpoint 502 sends an authentication request 504 to a client transport channel 506. The authentication request 504 includes credentials associated with the client endpoint 502. The client transport channel 506 forwards the authentication request 504 to a server transport channel 508 (for example, as a forwarded authentication request 510).

The forwarded authentication request 510 includes the credentials included in the authentication request 504 and the client token that the client transport channel 506 previously received from the server transport channel 508. The server transport channel 508 forwards the authentication request 510 to a credential validation and endpoint token creation component 512 (for example, as a forwarded authentication request 514).

The credential validation and endpoint token creation component 512 validates the received credentials by determining whether the received credentials have been previously mapped to a previously-created endpoint token. The credential validation and endpoint token creation component 512 sends an authentication response 516 to the server transport channel 508. The authentication response 516 includes either an endpoint (EP) token (if a mapping has been identified) or an indication of an error. The server transport channel 508 forwards the authentication response 516 (for example, as a forwarded authentication response 518) to the client transport channel 506. The client transport channel 506 forwards the authentication response 518 to the client endpoint 502 (for example, as a forwarded authentication response 520). The client endpoint 502 includes the received endpoint token in future messages that the client endpoint 502 sends to server endpoints included in the server.

Figure 6:
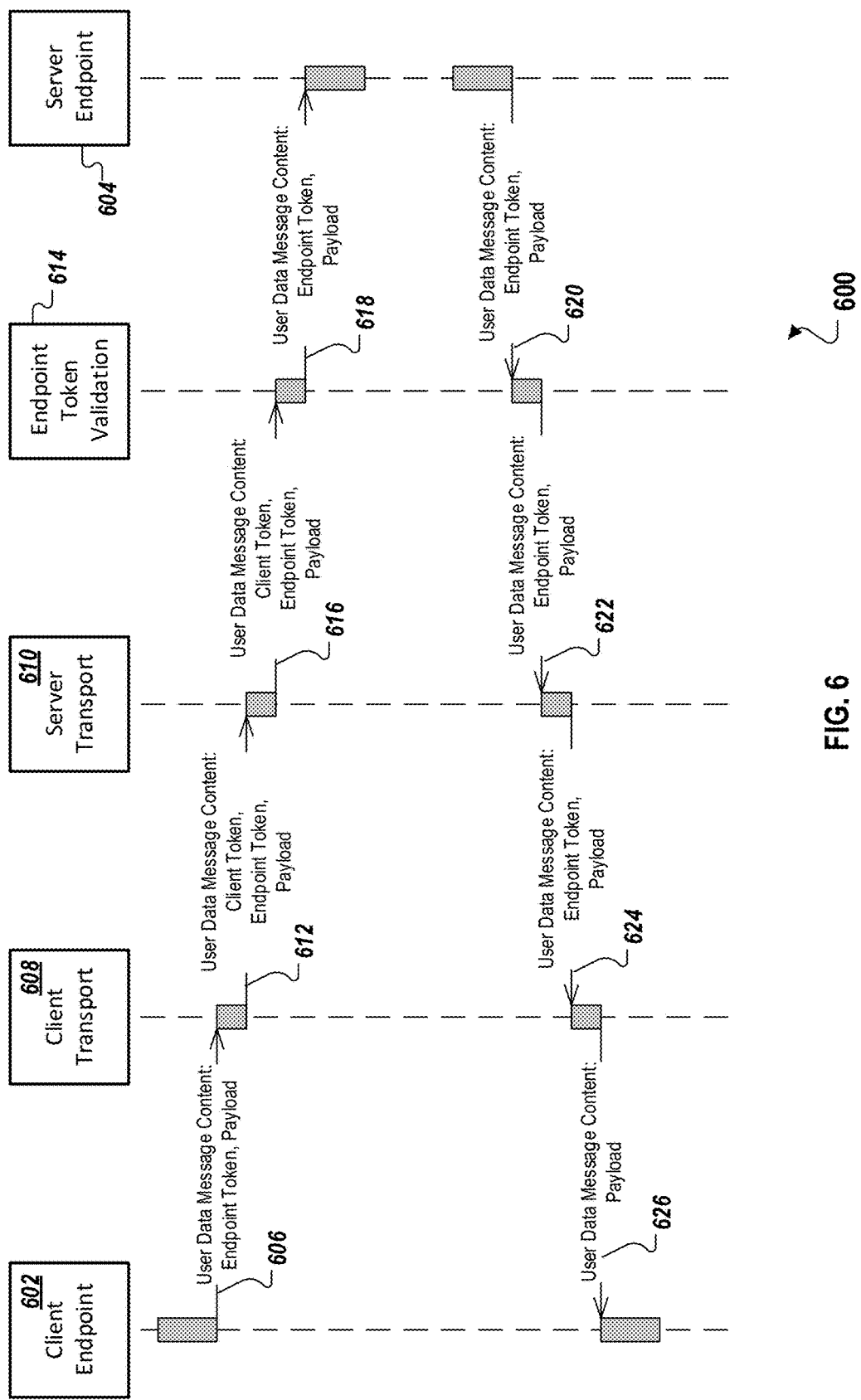
FIG. 6 is a flowchart of an example method for sending data between a client endpoint and a server endpoint, according to an implementation.

FIG. 6 is a flowchart of an example method 600 for sending data between a client endpoint 602 and a server endpoint 604, according to an implementation. The client endpoint 602 sends a message 606 targeted to the server endpoint 604 to a client transport channel 608. The message 606 includes an endpoint token previously received by the client endpoint 602 and a message payload.

The client transport channel 608 forwards the message 606 to a server transport channel 610 (as a forwarded message 612). The client transport channel 608 includes, in the forwarded message 612, a client token associated with the client process that includes the client endpoint 602. The server transport channel 610 forwards the message 612, including the client token, the endpoint token, and the message payload, to an endpoint token validation component 614 (for example, as a forwarded message 616).

The endpoint token validation component 614 validates the received endpoint token and client token. The endpoint token validation component 614 forwards the message 616, except for the client token, to the server endpoint 604 (as a forwarded message 618). The server endpoint 604 can extract the message payload in the message 618 and process the extracted message payload. At a later or some other time, the server endpoint 604 sends a message 620 targeted to the client endpoint 602 to the endpoint token validation component 614. The message 620 includes the endpoint token and a message payload.

The endpoint token validation component 614 forwards the message 620 to the server transport channel 610 (as a forwarded message 622). The server transport channel 610 forwards the message 622 to the client transport channel 608 (as a forwarded message 624). The client transport channel 608 forwards the message 624, except for the endpoint token) to the client endpoint 602 (as a forwarded message 626). The client endpoint 602 can extract the message payload in the message 626 and process the extracted message payload.

Figure 7:
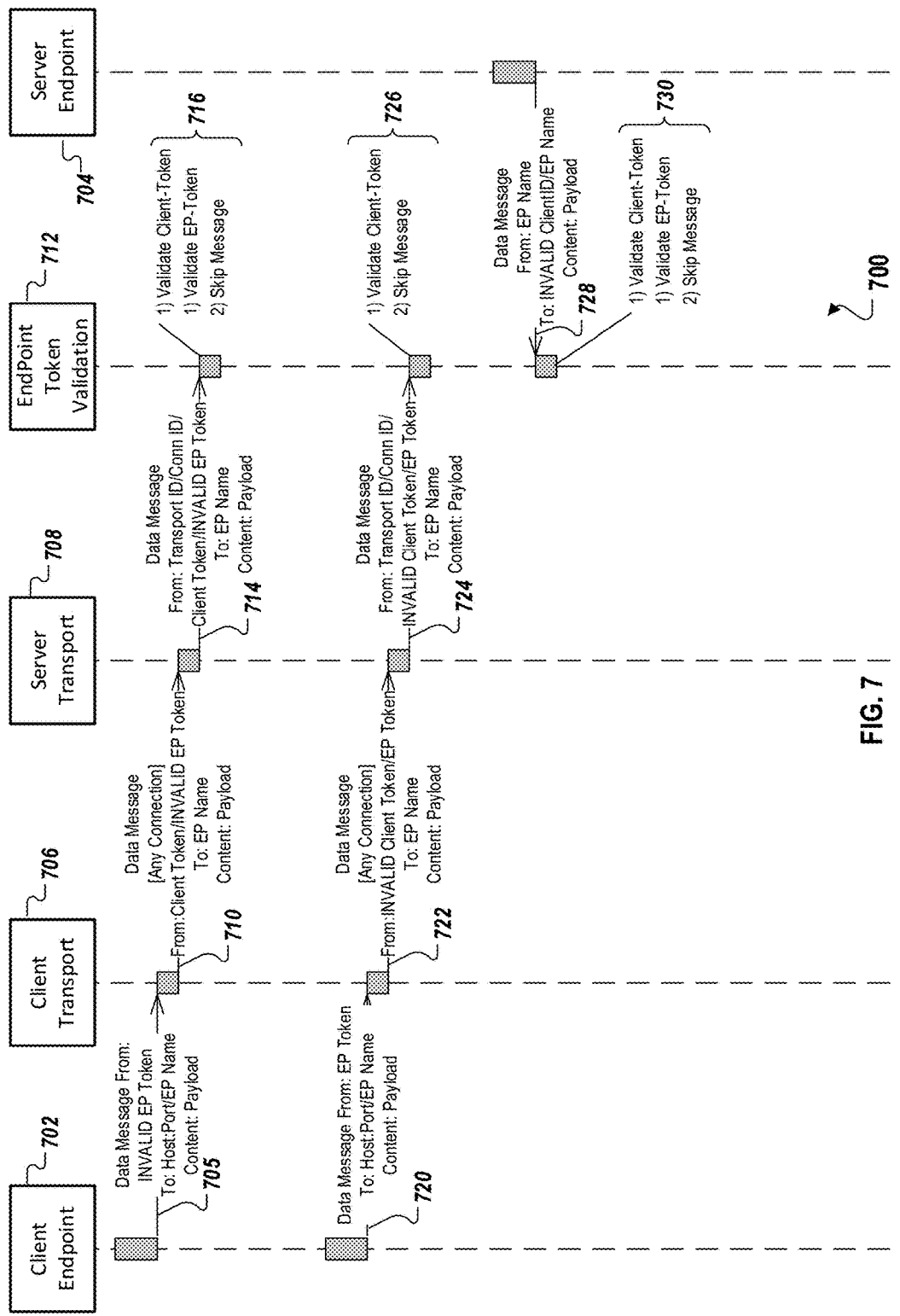
FIG. 7 is a flowchart of an example method for handling data messages with invalid authentication information, according to an implementation.

FIG. 7 is a flowchart of an example method 700 for handling data messages with invalid authentication information, according to an implementation. A client endpoint 702 sends a message 705 targeted to a server endpoint 704 to a client transport channel 706. The message 705 is addressed to a particular port and endpoint name associated with the server endpoint 704. The message 705 includes a message payload and an endpoint token associated with the client endpoint 702. The endpoint token is invalid.

The client transport channel 706 forwards the message 705 to a server transport channel 708, as a forwarded message 710. The forwarded message 710 includes a client token provided by the client transport channel 706. The server transport channel 708 forwards the message 710 to an endpoint token validation component 712, as a forwarded message 714.

As indicated by a note 716, the endpoint token validation component 712 validates the client token included in the message 714. The endpoint token validation component 712 attempts to validate the endpoint token included in the message 714, but the endpoint validation fails because the endpoint token is invalid. The endpoint token validation component 712 can determine to skip the message 714 (not forward the message 714 to the server endpoint 704).

At a later or some other time, the client endpoint 702 sends a message 720 targeted to the server endpoint 704 to the client transport channel 706. The message 720 is addressed to a particular port and endpoint name associated with the server endpoint 704. The message 720 includes a message payload and an endpoint token.

The client transport channel 706 forwards the message 720 to the server transport channel 708, as a forwarded message 722. The forwarded message 722 includes a client token provided by the client transport channel 706, but the client token is invalid. The server transport channel 708 forwards the message 722 to the endpoint token validation component 712, as a forwarded message 724. As indicated by a note 724, the endpoint token validation component 712 attempts to validate the client token included in the message 724, but the validation fails because the client token is invalid. The endpoint token validation component 712 can determine to skip the message 724 (not forward the message 714 to the server endpoint 704).

At a later or some other time, the server endpoint 704 sends a message 728 targeted to the client endpoint 702 to the endpoint token validation component 712. However, the message 728 includes an invalid client token and/or an invalid endpoint token. As indicated by a note 730, the endpoint token validation component 712 can attempt to validate the client token and an endpoint token included in the message 728. If either the client token validation or the endpoint validation fails, the endpoint token validation component 712 can determine to skip the message 728 (not send the message 728 to the server transport channel 708).

Figure 8:
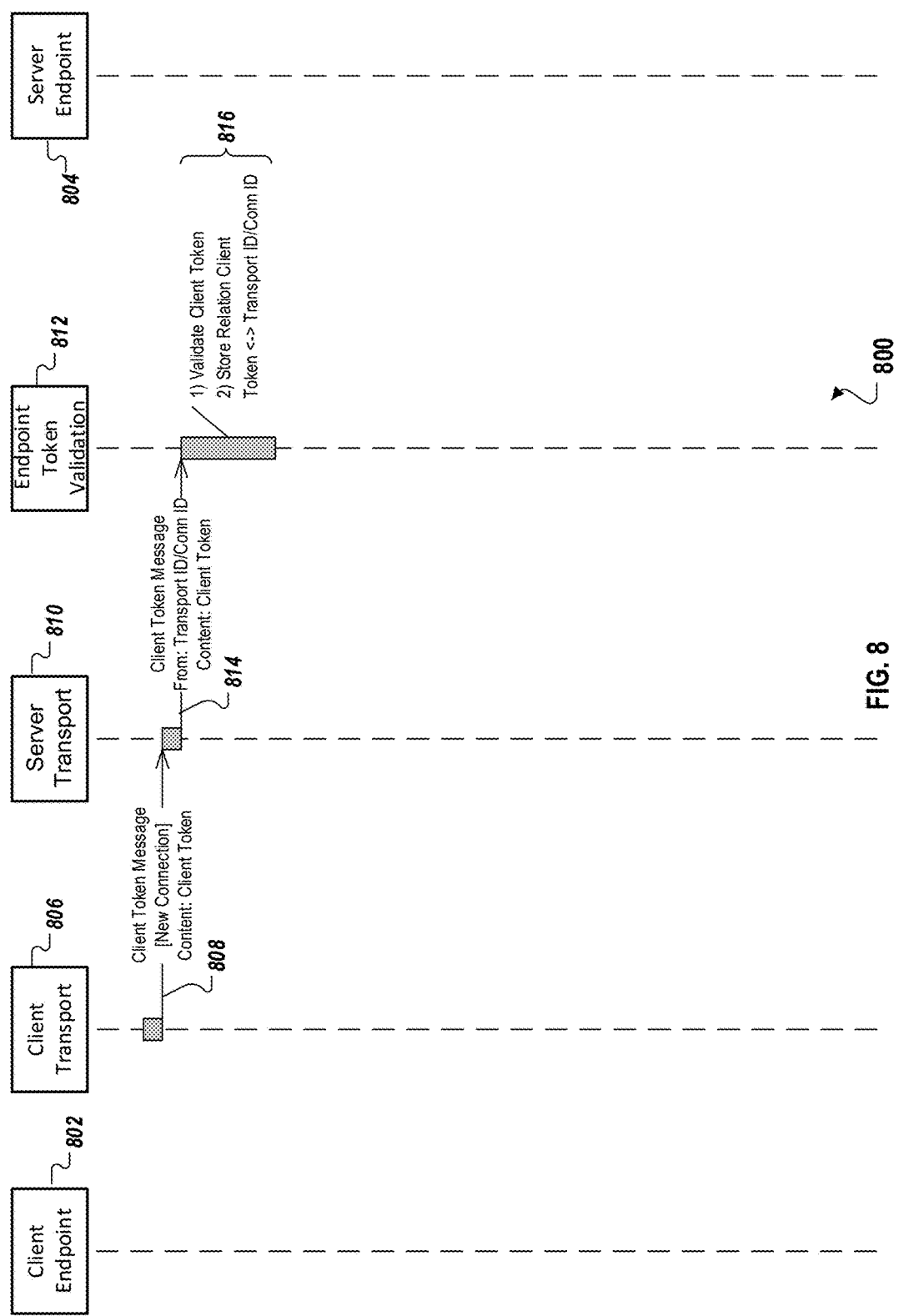
FIG. 8 is a flowchart of an example method for reconnecting a connection between a client endpoint and a server endpoint, according to an implementation.

FIG. 8 is a flowchart of an example method 800 for reconnecting a connection between a client endpoint 802 and a server endpoint 804, according to an implementation. For example, a client transport channel 806 can determine that a new connection is needed between the client endpoint 802 and the server endpoint 804. The client transport channel 806 can send a new connection request 808 to a server transport channel 810. The new connection request 808 includes a client token associated with the client process that includes the client endpoint 802. The server transport channel 810 forwards the new connection request to an endpoint token validation component 812, as a forwarded message 814. As indicated by a note 816, the endpoint token validation component 812 validates the client token included in the new connection request 814 and stores a mapping between the client token and a transport or connection identifier associated with the new connection request 814.

Figure 9:
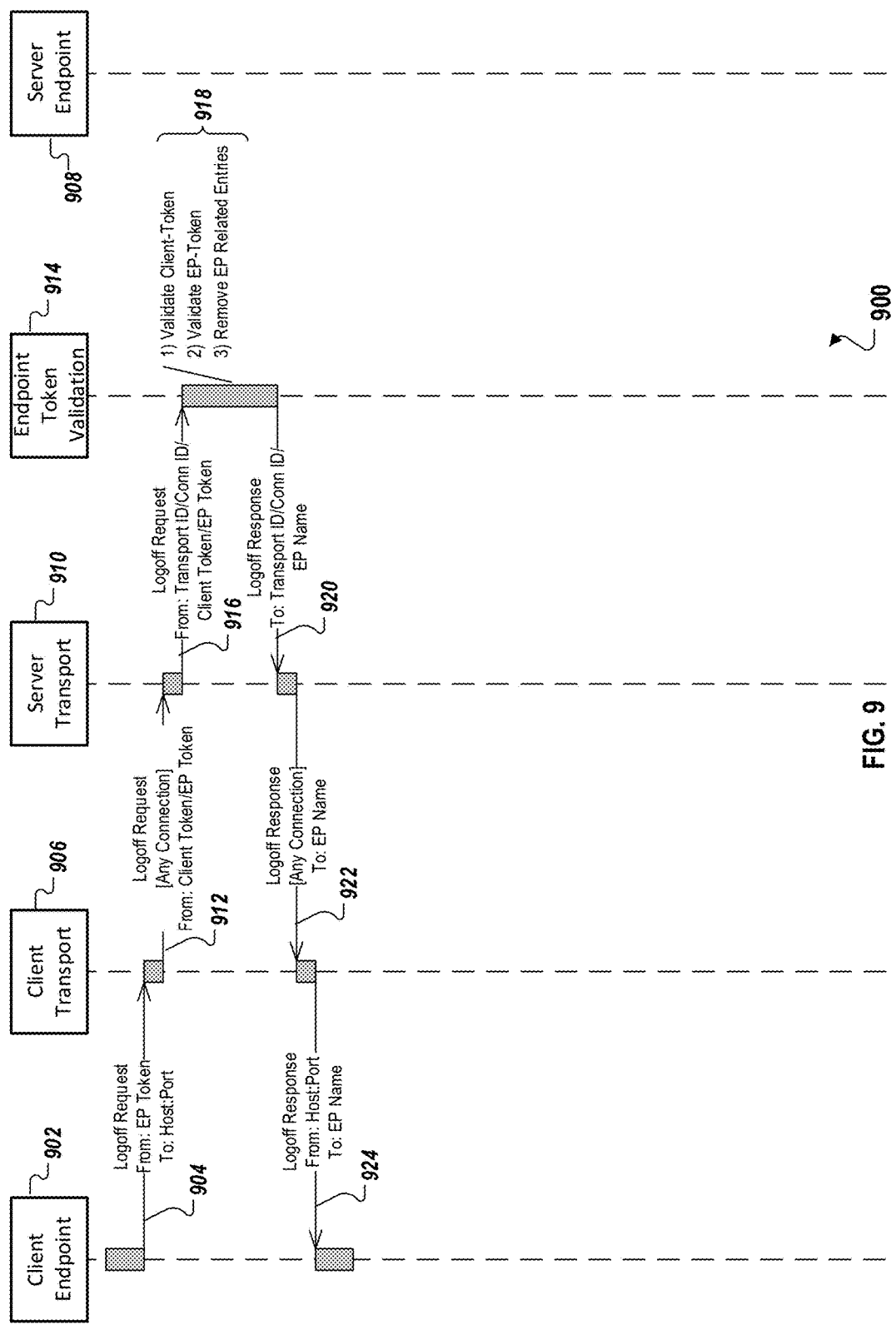
FIG. 9 is a flowchart of an example method for processing a logoff request from a client endpoint, according to an implementation.

FIG. 9 is a flowchart of an example method 900 for processing a logoff request from a client endpoint 902, according to an implementation. The client endpoint 902 sends a logoff request 904 to a client transport channel 906. The logoff request is associated with an endpoint token and is addressed to a host name and port associated with a server endpoint 908. The client transport channel 906 forwards the logoff request 904 to a server transport channel 910, as a forwarded logoff request 912. The client transport channel 906 includes, in the logoff request 912, a client token associated with the client process that includes the client endpoint 902. The server transport channel 910 forwards the logoff request 912 to an endpoint token validation component 914, as a forwarded logoff request 916. As indicated by a note 918, the endpoint token validation component 914 validates the client token and the endpoint token included in the logoff request 916, and removes mappings associated with the endpoint token.

The endpoint token validation component 914 sends a logoff response 920 to the server transport channel 910. The server transport channel 910 forwards the logoff response 920 to the client transport channel 906, as a forwarded logoff response 922. The client transport channel 906 forwards the logoff response 922 to the client endpoint 902, as a forwarded logoff response 924.

Figure 10:
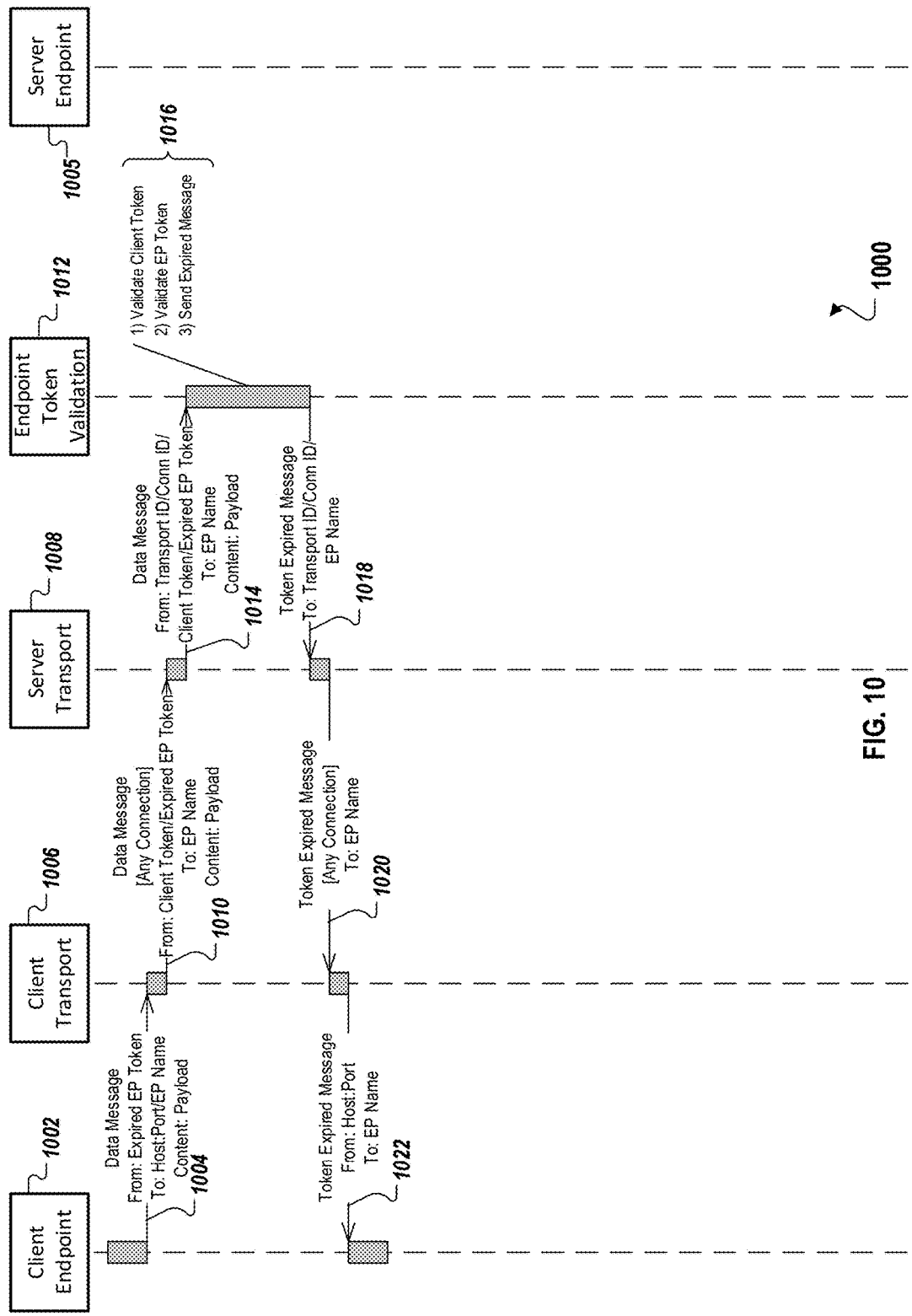
FIG. 10 is a flowchart of an example method for handling a data message that includes an expired endpoint token, according to an implementation.

FIG. 10 is a flowchart of an example method for handling a data message that includes an expired endpoint token, according to an implementation. A client endpoint 1002 sends a data message 1004 targeted to a server endpoint 1005 to a client transport channel 1006. The data message 1004 includes an expired endpoint token associated with the client endpoint 1002 and a message payload.

The client transport channel 1006 forwards the message 1004 to a server transport channel 1008 (as a forwarded message 1010). The client transport channel 1006 includes, in the forwarded message 1010, a client token associated with the client process that includes the client endpoint 1002. The server transport channel 1008 forwards the message 1010, including the client token, the endpoint token, and the message payload, to an endpoint token validation component 1012 (for example, as a forwarded message 1014).

As indicated by a note 1016, the endpoint token validation component 1012 attempts to validate the received client token and endpoint token. The endpoint token validation component 1012 determines that the endpoint token is expired. The endpoint token validation component 1012 sends an expired token message 1018 to the server transport channel. The server transport channel 1018 forwards the expired token message 1018 to the client transport channel 1006 (as a forwarded message 624). The client transport channel 1006 forwards the expired token message 1020 to the client endpoint 1002 (as a forwarded message 1022). The client endpoint 1002 can, at a later time, send a re-authentication request to the client transport channel 1006.

Figure 11:
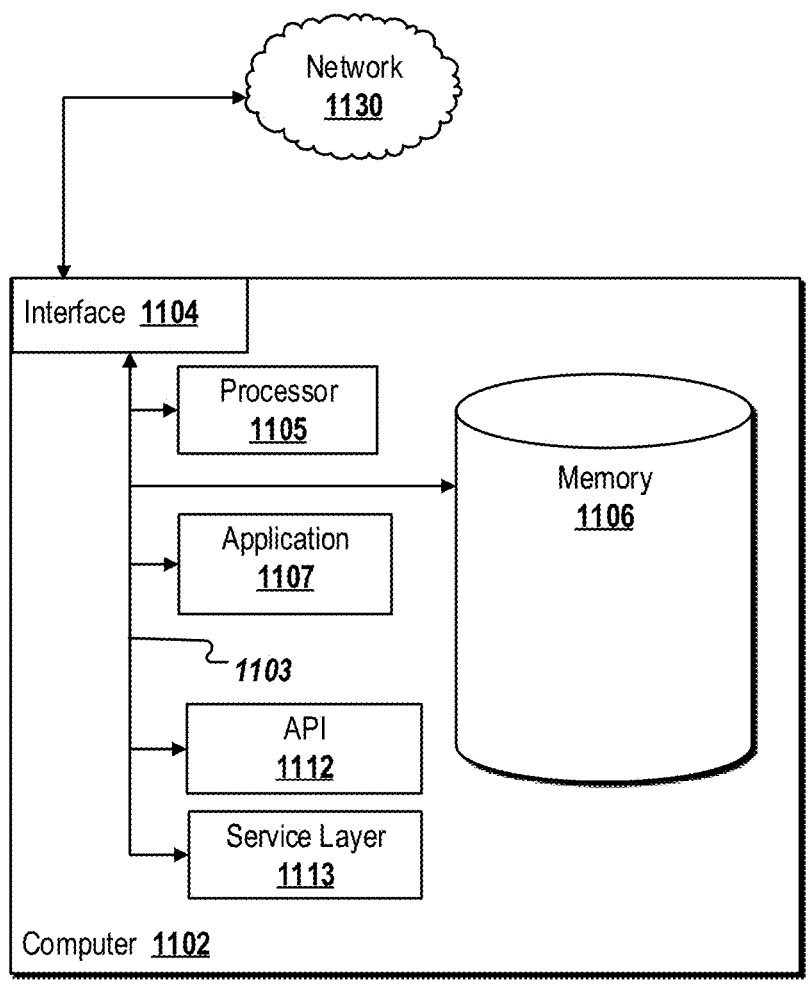
FIG. 11 is a block diagram of an exemplary computer system used to provide computational functionalities associated with described algorithms, methods, functions, processes, flows, and procedures for a dual-token authentication mechanism as described in the instant disclosure, according to an implementation.

FIG. 11 is a block diagram of an exemplary computer system 1100 used to provide computational functionalities associated with described algorithms, methods, functions, processes, flows, and procedures as described in the instant disclosure, according to an implementation. The illustrated computer 1102 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1102 may comprise a computer that includes an input device, such as a keypad, keyboard, touch screen, or other device that can accept user information, and an output device that conveys information associated with the operation of the computer 1102, including digital data, visual, or audio information (or a combination of information), or a GUI.

The computer 1102 can serve in a role as a client, network component, a server, a database or other persistency, or any other component (or a combination of roles) of a computer system for performing the subject matter described in the instant disclosure. The illustrated computer 1102 is communicably coupled with a network 1130. In some implementations, one or more components of the computer 1102 may be configured to operate within environments, including cloud-computing-based, local, global, or other environment (or a combination of environments).

At a high level, the computer 1102 is an electronic computing device operable to receive, transmit, process, store, or manage data and information associated with the described subject matter. According to some implementations, the computer 1102 may also include or be communicably coupled with an application server, e-mail server, web server, caching server, streaming data server, business intelligence (BI) server, or other server (or a combination of servers).

The computer 1102 can receive requests over network 1130 from a client application (for example, executing on another computer 1102) and responding to the received requests by processing the said requests in an appropriate software application. In addition, requests may also be sent to the computer 1102 from internal users (for example, from a command console or by other appropriate access method), external or third-parties, other automated applications, as well as any other appropriate entities, individuals, systems, or computers.

Each of the components of the computer 1102 can communicate using a system bus 1103. In some implementations, any or all of the components of the computer 1102, both hardware or software (or a combination of hardware and software), may interface with each other or the interface 1104 (or a combination of both) over the system bus 1103 using an application programming interface (API) 1112 or a service layer 1113 (or a combination of the API 1112 and service layer 1113). The API 1112 may include specifications for routines, data structures, and object classes. The API 1112 may be either computer-language independent or dependent and refer to a complete interface, a single function, or even a set of APIs. The service layer 1113 provides software services to the computer 1102 or other components (whether or not illustrated) that are communicably coupled to the computer 1102. The functionality of the computer 1102 may be accessible for all service consumers using this service layer. Software services, such as those provided by the service layer 1113, provide reusable, defined business functionalities through a defined interface. For example, the interface may be software written in JAVA, C++, or other suitable language providing data in extensible markup language (XML) format or other suitable format. While illustrated as an integrated component of the computer 1102, alternative implementations may illustrate the API 1112 or the service layer 1113 as stand-alone components in relation to other components of the computer 1102 or other components (whether or not illustrated) that are communicably coupled to the computer 1102. Moreover, any or all parts of the API 1112 or the service layer 1113 may be implemented as child or sub-modules of another software module, enterprise application, or hardware module without departing from the scope of this disclosure.

The computer 1102 includes an interface 1104. Although illustrated as a single interface 1104 in FIG. 11, two or more interfaces 1104 may be used according to particular needs, desires, or particular implementations of the computer 1102. The interface 1104 is used by the computer 1102 for communicating with other systems in a distributed environment that are connected to the network 1130 (whether illustrated or not). Generally, the interface 1104 comprises logic encoded in software or hardware (or a combination of software and hardware) and operable to communicate with the network 1130. More specifically, the interface 1104 may comprise software supporting one or more communication protocols associated with communications such that the network 1130 or interface's hardware is operable to communicate physical signals within and outside of the illustrated computer 1102.

The computer 1102 includes a processor 1105. Although illustrated as a single processor 1105 in FIG. 11, two or more processors may be used according to particular needs, desires, or particular implementations of the computer 1102. Generally, the processor 1105 executes instructions and manipulates data to perform the operations of the computer 1102 and any algorithms, methods, functions, processes, flows, and procedures as described in the instant disclosure.

The computer 1102 also includes a memory 1106 that holds data for the computer 1102 or other components (or a combination of both) that can be connected to the network 1130 (whether illustrated or not). For example, memory 1106 can be a database storing data consistent with this disclosure. Although illustrated as a single memory 1106 in FIG. 11, two or more memories may be used according to particular needs, desires, or particular implementations of the computer 1102 and the described functionality. While memory 1106 is illustrated as an integral component of the computer 1102, in alternative implementations, memory 1106 can be external to the computer 1102.

The application 1107 is an algorithmic software engine providing functionality according to particular needs, desires, or particular implementations of the computer 1102, particularly with respect to functionality described in this disclosure. For example, application 1107 can serve as one or more components, modules, applications, etc. Further, although illustrated as a single application 1107, the application 1107 may be implemented as multiple applications 1107 on the computer 1102. In addition, although illustrated as integral to the computer 1102, in alternative implementations, the application 1107 can be external to the computer 1102.

There may be any number of computers 1102 associated with, or external to, a computer system containing computer 1102, each computer 1102 communicating over network 1130. Further, the term "client," "user," and other appropriate terminology may be used interchangeably as appropriate without departing from the scope of this disclosure. Moreover, this disclosure contemplates that many users may use one computer 1102, or that one user may use multiple computers 1102.

Described implementations of the subject matter can include one or more features, alone or in combination.

For example, in a first implementation, a computer-implemented method includes receiving a request for a client token from a client process; generating a client token for the client process; providing the client token to the client process; receiving an authentication request from a client endpoint associated with the client process, the authentication request including the client token; authenticating the client endpoint, including generating an endpoint token for the client endpoint and providing the endpoint token to the client endpoint responsive to the authentication request; generating a first mapping between the client token and transport channels used for messages received from the client process; generating a second mapping between the client endpoint and the client token; receiving a first message over a first transport channel from the client endpoint, the message including the client token and the endpoint token; and sending a response to the first message to the client endpoint over a second transport channel, without re-authenticating the client endpoint, the second transport channel being different than the first transport channel and being selected based on the first and second mappings.

The foregoing and other described implementations can each optionally include one or more of the following features:

A first feature, combinable with any of the following features, wherein the authentication request includes credentials associated with the client endpoint.

A second feature, combinable with any of the previous or following features, wherein the authentication request includes credentials associated with the client endpoint.

A third feature, combinable with any of the previous or following features, wherein authenticating the client endpoint comprises validating the credentials included in the authentication request.

A fourth feature, combinable with any of the previous or following features, wherein the client token and the endpoint token are secure tokens.

A fifth feature, combinable with any of the previous or following features, wherein a secure token is a cryptographically strong random number.

A sixth feature, combinable with any of the previous or following features, wherein the client endpoint is a software component within the client process that is configured to send and receive messages.

A seventh feature, combinable with any of the previous or following features, wherein the first message is targeted to a server endpoint in a server process.

In a second implementation, a computer program product comprising computer-readable instructions, which, when loaded and executed on a computer system, cause the computer system to perform operations comprising: receiving a request for a client token from a client process; generating a client token for the client process; providing the client token to the client process; receiving an authentication request from a client endpoint associated with the client process, the authentication request including the client token; authenticating the client endpoint, including generating an endpoint token for the client endpoint and providing the endpoint token to the client endpoint responsive to the authentication request; generating a first mapping between the client token and transport channels used for messages received from the client process; generating a second mapping between the client endpoint and the client token; receiving a first message over a first transport channel from the client endpoint, the message including the client token and the endpoint token; and sending a response to the first message to the client endpoint over a second transport channel, without re-authenticating the client endpoint, the second transport channel being different than the first transport channel and being selected based on the first and second mappings.

The foregoing and other described implementations can each optionally include one or more of the following features:

A first feature, combinable with any of the following features, wherein the authentication request includes credentials associated with the client endpoint.

A second feature, combinable with any of the previous or following features, wherein the authentication request includes credentials associated with the client endpoint.

A third feature, combinable with any of the previous or following features, wherein authenticating the client endpoint comprises validating the credentials included in the authentication request.

A fourth feature, combinable with any of the previous or following features, wherein the client token and the endpoint token are secure tokens.

A fifth feature, combinable with any of the previous or following features, wherein a secure token is a cryptographically strong random number.

A sixth feature, combinable with any of the previous or following features, wherein the client endpoint is a software component within the client process that is configured to send and receive messages.

A seventh feature, combinable with any of the previous or following features, wherein the first message is targeted to a server endpoint in a server process.

In some implementations, the computer program product can be implemented on a non-transitory, computer-readable medium storing one or more instructions executable by a computer system to perform the above-described operations.

In a third implementation, a computer system, comprising: a computer memory; and a hardware processor interoperably coupled with the computer memory and configured to perform operations comprising: receiving a request for a client token from a client process; generating a client token for the client process; providing the client token to the client process; receiving an authentication request from a client endpoint associated with the client process, the authentication request including the client token; authenticating the client endpoint, including generating an endpoint token for the client endpoint and providing the endpoint token to the client endpoint responsive to the authentication request; generating a first mapping between the client token and transport channels used for messages received from the client process; generating a second mapping between the client endpoint and the client token; receiving a first message over a first transport channel from the client endpoint, the message including the client token and the endpoint token; and sending a response to the first message to the client endpoint over a second transport channel, without re-authenticating the client endpoint, the second transport channel being different than the first transport channel and being selected based on the first and second mappings.

The foregoing and other described implementations can each optionally include one or more of the following features:

A first feature, combinable with any of the following features, wherein the authentication request includes credentials associated with the client endpoint.

A second feature, combinable with any of the previous or following features, wherein the authentication request includes credentials associated with the client endpoint.

A third feature, combinable with any of the previous or following features, wherein authenticating the client endpoint comprises validating the credentials included in the authentication request.

A fourth feature, combinable with any of the previous or following features, wherein the client token and the endpoint token are secure tokens.

A fifth feature, combinable with any of the previous or following features, wherein a secure token is a cryptographically strong random number.

A sixth feature, combinable with any of the previous or following features, wherein the client endpoint is a software component within the client process that is configured to send and receive messages.

A seventh feature, combinable with any of the previous or following features, wherein the first message is targeted to a server endpoint in a server process.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
by one or more a hardware processors:
receiving a request for a client token from a client process;
generating a client token for the client process;
providing the client token to the client process;
receiving an authentication request from a client endpoint associated with the client process, the authentication request including the client token;
authenticating the client endpoint, including generating an endpoint token for the client endpoint and providing the endpoint token to the client endpoint responsive to the authentication request;
generating a first mapping between the client token and transport channels used for messages received from the client process;
generating a second mapping between the client endpoint and the client token;
receiving a first message over a first transport channel from the client endpoint, the message including the client token and the endpoint token; and
sending a response to the first message to the client endpoint over a second transport channel, without re-authenticating the client endpoint, the second transport channel being different than the first transport channel and being selected based on the first and second mappings.

2. The computer-implemented method of claim 1, wherein the authentication request includes credentials associated with the client endpoint.

3. The computer-implemented method of claim 2, wherein authenticating the client endpoint comprises validating the credentials included in the authentication request.

4. The computer-implemented method of claim 1, wherein the client token and the endpoint token are secure tokens.

5. The computer-implemented method of claim 4, wherein a secure token is a cryptographically strong random number.

6. The computer-implemented method of claim 1, wherein the client endpoint is a software component within the client process that is configured to send and receive messages.

7. The computer-implemented method of claim 1, wherein the first message is targeted to a server endpoint in a server process.

8. A non-transitory, computer-readable medium storing one or more instructions executable by a computer system to perform operations comprising:
receiving a request for a client token from a client process;
generating a client token for the client process;
providing the client token to the client process;
receiving an authentication request from a client endpoint associated with the client process, the authentication request including the client token;
authenticating the client endpoint, including generating an endpoint token for the client endpoint and providing the endpoint token to the client endpoint responsive to the authentication request;
generating a first mapping between the client token and transport channels used for messages received from the client process;
generating a second mapping between the client endpoint and the client token;
receiving a first message over a first transport channel from the client endpoint, the message including the client token and the endpoint token; and
sending a response to the first message to the client endpoint over a second transport channel, without re-authenticating the client endpoint, the second transport channel being different than the first transport channel and being selected based on the first and second mappings.

9. The computer-readable medium of claim 8, wherein the authentication request includes credentials associated with the client endpoint.

10. The computer-readable medium of claim 9, wherein authenticating the client endpoint comprises validating the credentials included in the authentication request.

11. The computer-readable medium of claim 8, wherein the client token and the endpoint token are secure tokens.

12. The computer-readable medium of claim 11, wherein a secure token is a cryptographically strong random number.

13. The computer-readable medium of claim 8, wherein the client endpoint is a software component within the client process that is configured to send and receive messages.

14. The computer-readable medium of claim 8, wherein the first message is targeted to a server endpoint in a server process.

15. A computer system, comprising:
a computer memory; and
a hardware processor interoperably coupled with the computer memory and configured to perform operations comprising:
receiving a request for a client token from a client process;
generating a client token for the client process;
providing the client token to the client process;
receiving an authentication request from a client endpoint associated with the client process, the authentication request including the client token;
authenticating the client endpoint, including generating an endpoint token for the client endpoint and providing the endpoint token to the client endpoint responsive to the authentication request;
generating a first mapping between the client token and transport channels used for messages received from the client process;
generating a second mapping between the client endpoint and the client token;
receiving a first message over a first transport channel from the client endpoint, the message including the client token and the endpoint token; and
sending a response to the first message to the client endpoint over a second transport channel, without re-authenticating the client endpoint, the second transport channel being different than the first transport channel and being selected based on the first and second mappings.

16. The computer system of claim 15, wherein the authentication request includes credentials associated with the client endpoint.

17. The computer system of claim 16, wherein authenticating the client endpoint comprises validating the credentials included in the authentication request.

18. The computer system of claim 15, wherein the client token and the endpoint token are secure tokens.

19. The computer system of claim 18, wherein a secure token is a cryptographically strong random number.

20. The computer system of claim 15, wherein the client endpoint is a software component within the client process that is configured to send and receive messages.

* * * * *